United States Patent
Belpaire

(10) Patent No.: US 9,290,211 B2
(45) Date of Patent: Mar. 22, 2016

(54) BONDING WITH ADHESIVE BEADS OR PLOTS

(75) Inventor: Vincent Belpaire, Uccle (BE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 13/286,684

(22) Filed: Nov. 1, 2011

(65) Prior Publication Data

US 2012/0043019 A1 Feb. 23, 2012

Related U.S. Application Data

(63) Continuation of application No. PCT/EP2010/056068, filed on May 5, 2010.

(30) Foreign Application Priority Data

May 5, 2009 (EP) .................................. 09159416

(51) Int. Cl.
| | |
|---|---|
| B32B 3/10 | (2006.01) |
| B32B 37/12 | (2006.01) |
| B62D 27/02 | (2006.01) |
| B29C 44/12 | (2006.01) |
| B62D 29/00 | (2006.01) |

(Continued)

(52) U.S. Cl.
CPC .......... *B62D 27/026* (2013.01); *B29C 44/1228* (2013.01); *B62D 21/09* (2013.01); *B62D 29/002* (2013.01); *B62D 29/005* (2013.01); *B29C 44/18* (2013.01); *Y10T 428/14* (2015.01); *Y10T 428/24273* (2015.01)

(58) Field of Classification Search
CPC .. B29C 44/1228; B29C 44/18; B62D 27/026; B62D 29/005; B62D 29/002; B62D 21/09; Y10T 428/24273

USPC .......... 428/40.1; 52/309.15–309.17, 831–847
See application file for complete search history.

(56) References Cited

U.S. PATENT DOCUMENTS

| | | | |
|---|---|---|---|
| 4,868,968 A | 9/1989 | Dixon et al. | |
| 5,358,397 A | 10/1994 | Ligon et al. | |
| 6,021,753 A | 2/2000 | Chaffin et al. | |

(Continued)

FOREIGN PATENT DOCUMENTS

| | | |
|---|---|---|
| EP | 1 398 250 A2 | 3/2004 |
| EP | 1 387 789 B1 | 9/2006 |

(Continued)

OTHER PUBLICATIONS

International Search Report (PCT/ISA/210) issued on Jul. 6, 2010, by European Patent Office as the International Searching Authority for International Application No. PCT/EP2010/056068.

(Continued)

*Primary Examiner* — Patricia L Nordmeyer
(74) *Attorney, Agent, or Firm* — Buchanan Ingersoll & Rooney PC

(57) ABSTRACT

A structural member includes one or more walls that define a cavity. A system for reinforcing the cavity includes a substantially rigid carrier configured to reside in the cavity. The carrier includes a pathway disposed in the carrier that provides an aperture between an exterior surface of the carrier and an interior surface of the carrier. An adhesive is disposed in a gap between at least a portion of the exterior surface of the carrier and the wall of the structural member. The adhesive is disposed proximate to the pathway.

45 Claims, 11 Drawing Sheets

(51) Int. Cl.
B62D 21/09 (2006.01)
B29C 44/18 (2006.01)

(56) References Cited

U.S. PATENT DOCUMENTS

| | | | |
|---|---|---|---|
| 6,058,673 A | 5/2000 | Wycech | |
| 6,305,136 B1 | 10/2001 | Hopton et al. | |
| 6,382,635 B1 * | 5/2002 | Fitzgerald | 277/630 |
| 6,406,078 B1 * | 6/2002 | Wycech | 293/120 |
| 6,467,834 B1 * | 10/2002 | Barz et al. | 296/187.02 |
| 6,619,727 B1 * | 9/2003 | Barz et al. | 296/187.02 |
| 7,160,491 B2 * | 1/2007 | Barz et al. | 264/46.6 |
| 7,290,828 B2 | 11/2007 | Kosal et al. | |
| 7,838,100 B2 * | 11/2010 | McLeod et al. | 428/172 |
| 2002/0074827 A1 * | 6/2002 | Fitzgerald et al. | 296/188 |
| 2002/0088908 A1 | 7/2002 | Broccardo et al. | |
| 2002/0174954 A1 | 11/2002 | Busseuil et al. | |
| 2005/0166532 A1 * | 8/2005 | Barz | 52/731.7 |
| 2005/0276970 A1 | 12/2005 | Busseuil et al. | |
| 2006/0008615 A1 | 1/2006 | Muteau et al. | |
| 2007/0277926 A1 | 12/2007 | Naughton et al. | |
| 2008/0023987 A1 | 1/2008 | Schneider et al. | |
| 2008/0060742 A1 | 3/2008 | Sheasley et al. | |
| 2009/0108626 A1 | 4/2009 | Richardson et al. | |

FOREIGN PATENT DOCUMENTS

| | | |
|---|---|---|
| EP | 1 932 648 A1 | 6/2008 |
| EP | 2 159 136 A1 | 3/2010 |
| EP | 2 427 362 B1 | 3/2014 |
| WO | 96/37400 A1 | 11/1996 |
| WO | 97/43501 A1 | 11/1997 |
| WO | 01/54893 A2 | 8/2001 |
| WO | 01/83206 A1 | 11/2001 |
| WO | 03/000535 A1 | 1/2003 |
| WO | WO 2006/091794 A1 | 8/2006 |
| WO | 2008/077944 A1 | 7/2008 |
| WO | WO 2008/077944 A1 | 7/2008 |

OTHER PUBLICATIONS

Written Opinion (PCT/ISA/237) issued on Jul. 6, 2010, by European Patent Office as the International Searching Authority for International Application No. PCT/EP2010/056068.

Communication of a notice of opposition filed with respect to corresponding European Patent No. 2427362 dated Dec. 12, 2014 by Henkel AG & Co. KGaA.

Notice of opposition to a European patent filed with respect to corresponding European Patent No. 2427362 dated Mar. 5, 2014 by L&L Products Europe SAS.

* cited by examiner

BONDING WITH ADHESIVE BEADS OR PLOTS

RELATED APPLICATIONS

This application claims priority as a continuation application under 35 U.S.C. §120 to PCT/EP2010/056068, which was filed as an International Application on May 5, 2010 designating the U.S., and which claims priority to European Application No. 09159416.8 filed in Europe on May 5, 2009. The entire contents of these applications are hereby incorporated by reference in their entireties.

FIELD

Disclosed are a system for reinforcing a cavity and method of reinforcing a cavity.

BACKGROUND INFORMATION

Products can include panels that have a cavity between an inner and an outer portion. For example, vehicles, such as cars and trucks, can include panels that have such a cavity. Such panels can have many different sizes, shapes, and configurations. In one example, a panel can have a generally tubular construction, such as an elongated hollow pillar, rail, beam, etc., connected by one or more nodes. Such cavities can be reinforced for many reasons. Reinforcing a cavity in a panel can add structural strength while reducing noise and vibration. Such cavities can be reinforced using high-strength steels, increasing component thicknesses, or including additional reinforcements. However, such constructions can add to material and processing costs. In addition, such constructions add weight, which can negatively affect fuel performance.

Reinforcing a cavity can also be accomplished using a reinforcer or carrier bonded by an adhesive to a structural member. Adhesive can be placed between the carrier and the structural member and then the two components can be squeezed together. The gap between a carrier and a structural member can vary based on manufacturing and assembly tolerances. Thus, if the amount of adhesive is relatively consistent, the flow of the adhesive within the cavity can vary based on the tolerances. In some circumstances, adhesive can flow outside of the cavity. In addition, adhesive can block a desired fluid channel, effectively preventing e-coating from covering the surface of the structural member.

SUMMARY

According to an exemplary aspect, a system for reinforcing a cavity is provided, comprising:
a substantially rigid carrier configured to reside in a cavity defined by one or more walls of a structural member;
a pathway disposed in the carrier providing an aperture between an exterior surface and an interior surface of the carrier; and
an adhesive disposed in a gap between at least a portion of the exterior surface of the carrier and the wall of the structural member.

According to an exemplary aspect, a system for reinforcing a cavity is provided, comprising:
a substantially rigid carrier configured to reside in a cavity defined by one or more walls of a structural member;
the structural member;
an adhesive disposed in a gap between at least a portion of an exterior surface of the carrier and a wall of the structural member; and
a pathway disposed in the carrier, wherein the pathway is arranged to accommodate a flow of the adhesive between the exterior surface and an interior surface of the carrier.

According to an exemplary aspect, a method of reinforcing a cavity is provided, comprising adhering a substantially rigid carrier to a structural member with an adhesive,
wherein the substantially rigid carrier is configured to reside in a cavity defined by one or more walls of the structural member;
wherein a pathway disposed in the carrier provides an aperture between an exterior surface and an interior surface of the carrier;
wherein the adhesive is disposed in a gap between at least a portion of the exterior surface of the carrier and the wall of the structural member.

DETAILED DESCRIPTION

Disclosed are exemplary systems and methods for reinforcing a cavity. For example, the disclosure is directed to a carrier that reinforces a cavity within a structural member, where the carrier and the structural member are adhered to one another using an adhesive. The carrier can be substantially rigid and configured to reside in the cavity. The carrier can include a pathway disposed in the carrier that provides an aperture between an exterior surface of the carrier and an interior surface of the carrier. An adhesive can be disposed in a gap between at least a portion of the exterior surface of the carrier and the wall of the structural member. The adhesive can be disposed proximate to the pathway.

Examples described herein include a carrier configured to provide reinforcement to a structural member. The structural member can be, for example, a beam, a channel, a pillar, etc., within a product, such as a vehicle. The carrier can be adhered to the structural member using an adhesive. For example, the carrier and structural member can be squeezed or pressure fit together to force the adhesive to flow between the two components. Due to various manufacturing and assembly tolerances, the amount of adhesive covering the surface of the structural member can vary after squeezing the components together. When the gap between the components is small, the adhesive may be squeezed outside of the cavity or may block an intended fluid flow path, thereby preventing e-coat from contacting portions of the structural member. This application is related to European Application No. 08163412, filed on Sep. 1, 2008, the entirety of which is hereby incorporated by reference.

Pathways can be provided in the carrier near and/or beneath the adhesive, allowing the adhesive to flow through the carrier. For example, each pathway can provide an opening between a first, exterior surface of the carrier to a second, interior surface of the carrier. The pathways can provide additional avenues for the adhesive to flow, thereby moderating the amount of adhesive that can cover the surface of the structural member. The amount of adhesive covering the surface of the structural member after the adhesive is squeezed between the carrier and the structural member can remain relatively consistent, regardless of manufacturing tolerances (e.g. varying gap sizes). The pathways can also reduce the force required to squeeze the adhesive between the structural member and the carrier. A carrier can also include one or more channels to provide a segmented, or dedicated fluid flow path, for example, to allow e-coating to flow over the structural member.

Figure 1A:
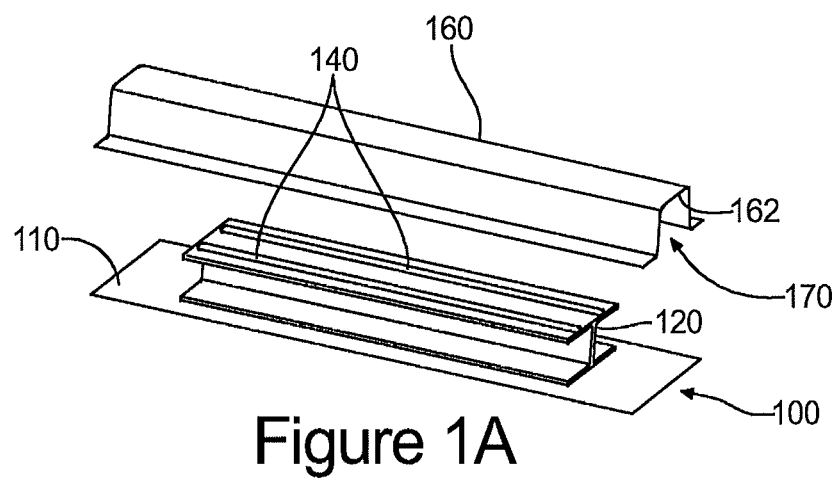
FIGS. 1A and 1B illustrate a system for reinforcing a cavity, according to an exemplary aspect.
Figure 1B:
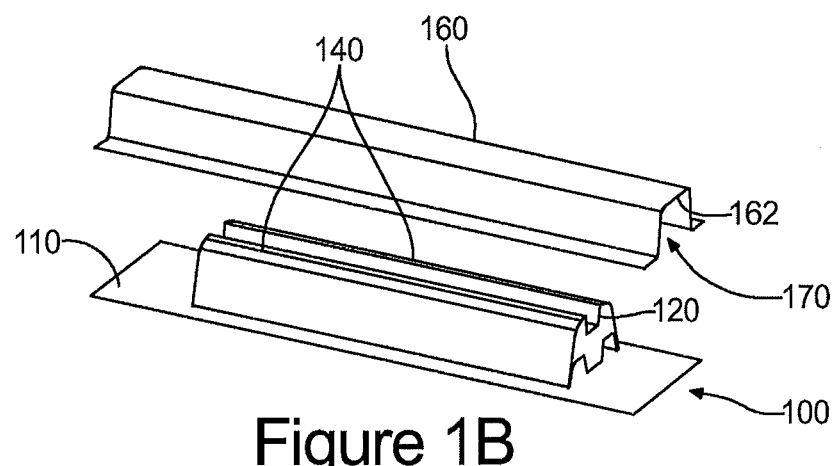

FIGS. 1A and 1B illustrate an exemplary system 100 for reinforcing a cavity. System 100 can include a carrier 120, adhesive 140, and a structural member 160. Carrier 120 can be substantially shaped to fit within a cavity 170, which is defined by one or more interior walls 162 of structural member 160 and a base 110. Carrier 120 can also be shaped to contact two or more opposing walls 162 of structural member 160, in order to provide structural reinforcement. As illustrated in FIG. 1A, carrier 120 can be I-shaped, or substantially shaped as an I-beam. In FIG. 1B, carrier 120 can be substantially W or M-shaped. Of course, carrier 120 can also be shaped in one or more of any number of different configurations, for example, based on a particular application. For example, carrier 120 can be shaped as an H, C, U, Z, S, N, X, V, E, K, T, etc. For example, carrier 120 can be a substantially rigid construction that includes one or more longitudinal ribs that run parallel to the main or long axis of cavity 170 in structural member 160, and two or more potentially opposing exterior surfaces that are adhered to walls 162 using adhesive 140. In addition, carrier 120 can also include an array of lateral ribs.

As illustrated, adhesive 140 can be arranged in a series of parallel rows along an exterior surface of carrier 120 such that adhesive 140 will contact structural member 160. However, adhesive 140 can be disposed on either carrier 120, structural member 160, or both, and may be disposed in rows, beads, plots, etc. The amount and positioning of adhesive 140 can be such that adhesive 140 will contact one or more inner walls 162 of structural member 160 when carrier 120 is positioned within cavity 170. Adhesive 140 can be squeezed between carrier 120 and structural member 160, forcing adhesive 140 to flow along the surfaces of carrier 120 and structural member 160. Adhesive 140 can be positioned such that one or more fluid flow paths are defined between carrier 120 and walls 162 to allow fluid, such as e-coat fluid, to flow and coat the surface of structural member 160.

Carrier 120, which may also be referred to as a reinforcer, can be substantially rigid and can be made of metal, such as aluminum or steel, plastic, nylon, glass-reinforced nylon, a foam structure, an organic structure, or some combination thereof. In one example, carrier 120 can be made of a thermoplastic material. Carrier 120 can be made by any number of different manufacturing processes, including through extrusion, injection molding, or through other suitable process. Carrier 120 can also include one or more additional features or structural enhancements, including ribs, to provide localized strengthening, for example, based on a particular application. At least a portion of carrier 120 can be designed to conform closely in shape to a portion of structural member 160. For example, one or more outer faces of the carrier portion of carrier 120 can be configured to conform generally to one or more inner walls 162 of structural member 160.

Adhesive 140 can be used to secure carrier 120 to structural member 160. Adhesive 140 can be applied to carrier 120, as illustrated in FIGS. 1A and 1B, such as along an outer face of the carrier. Alternatively or additionally, adhesive 140 can be applied to structural member 160, such as along one or more inner walls 162 defining a cavity in structural member 160. Adhesive 140 can be applied before placing carrier 120 into position within a cavity of structural member 160. Carrier 120 and structural member 160 can then be squeezed together. Adhesive 140 can cure while carrier 120 is positioned within cavity 170, thereby adhering carrier 120 to structural member 160.

Adhesive 140 can be applied in any number of ways. For example, adhesive 140 can be applied in parallel lines on an exterior surface of carrier 120, as illustrated in FIGS. 1A and 1B. Adhesive 140 can also be applied as beads or plots on one or more faces of carrier 120 and/or structural member 160. The length, width, thickness, shape, cross-section, surface, quantity, and placement of adhesive 140 can vary, and may be based on application parameters, such as, for example, minimizing cost, maximizing strength, assembly time, curing time, gap size, etc. Adhesive 140 can be applied such that the thickness of adhesive 140 is greater than the width of a gap defined between the carrier 120 and one or more inner walls 162 of structural member 160. For example, the gap between structural member 160 and carrier 120 can be based on the distance between the components when placed into position. When carrier 120 is positioned within cavity 170 adjacent to structural member 160, adhesive 140 can contact both carrier 120 and structural member 160, thereby deforming adhesive 140. Adhesive 140 can thus adhere carrier 120 to structural member 160. The amount of adhesive 140 may be based on a pre-determined gap distance between carrier 120 and structural member 160. In an exemplary embodiment, the thickness of an adhesive bead can be a minimum of about 150% of the width of the gap between carrier 120 and structural member 160.

Adhesive 140 can be any of a number of adhesives. Adhesive 140 can be a substantially non-foaming or non-expanding adhesive. That is, adhesive 140 can be an adhesive that expands less than about 20% when curing. Adhesive 140 can be an adhesive that expands less than about 5% when curing, or adhesive 140 can be a non-expandable adhesive. Adhesive 140 can have a viscosity that is high enough that the adhesive retains a shape until carrier 120 is squeezed against structural member 160. Adhesive 140 can have a paste-like consistency prior to curing, and/or can be tacky or sticky. Adhesive 140 can act like a Bingham plastic, retaining a substantially stable shape prior to application of sufficient stress. Adhesive 140 can cure through exposure to air, atmospheric moisture, another chemical, heat, light, or according to any other appropriate curing method. According to an exemplary embodiment, adhesive 140 can be an adhesive that cures when exposed to heat, such as during a baking or e-coating process. Adhesive 140 can be, for example, a polymer composition including at least a resin and a hardener. For example, adhesive 140 can be a polyurethane composition, a polyurethane and polyol isocyanate composition, an acrylate composition, an epoxide composition, etc. Adhesive 140 can include an epoxy resin and hardener, such as a polyisocyanate or polyamine hardener, microencapsulated acrylic or methacrylate, etc. Exemplary suitable adhesives can include those adhesives described in International Publication No. WO 2008/077944.

A protective film can be applied over adhesive 140 to prevent adhesive 140 from curing prematurely, prevent dust or other contaminants from sticking to adhesive 140, protect adhesive 140 from exposure to moisture or air, and/or protect shelf life and adhesion properties. The protective film can be co-extruded with adhesive 140, or can be applied on top of adhesive 140. According to an exemplary embodiment, the protective film can be a plastic, such as polyethylene. The protective film can be removed prior to, during, or after placing carrier 120 proximate to structural member 160.

Structural member 160 can be a component of a product, such as a vehicle. For example, structural member 160 may be a structural component, such as a beam or a pillar of a car or truck. Structural member 160 can be a solid component made from a metal, such as steel. Structural member 160 can be made from any number of different materials, such as carbon fiber, plastic, etc. Adhesive 140 can be selected based on the material properties of carrier 120 and structural member 160, to ensure that adhesive 140 will bond according to specific application requirements.

System 100 can be configured to maintain a pre-determined gap between carrier 120 and walls 162 of structural member 160. Based on the pre-determined gap, an amount of adhesive 140 can be placed on carrier 120 or on walls 162 to ensure that a fluid flow path is maintained after squeezing the component together. The amount of adhesive 140 applied can be pre-determined based on the pre-determined gap size, for example, including factoring in a certain amount for various tolerances. Carrier 120 and structural member 160 can then be squeezed together, forcing adhesive 140 to flow over carrier 120 and walls 162. Due to manufacturing tolerances, the size of the gap between the components may vary. Thus, the surface area of carrier 120 and walls 162 covered by adhesive 140 after squeezing may vary, as illustrated in FIGS. 2A-2B and 3A-3C. When the tolerance approaches a lower limit (i.e., smaller gap size), the surface area covered by adhesive 140 after squeezing may be substantial, potentially impeding a fluid flow path and/or having adhesive 140 flowing outside of a weld seam.

Figure 2A:
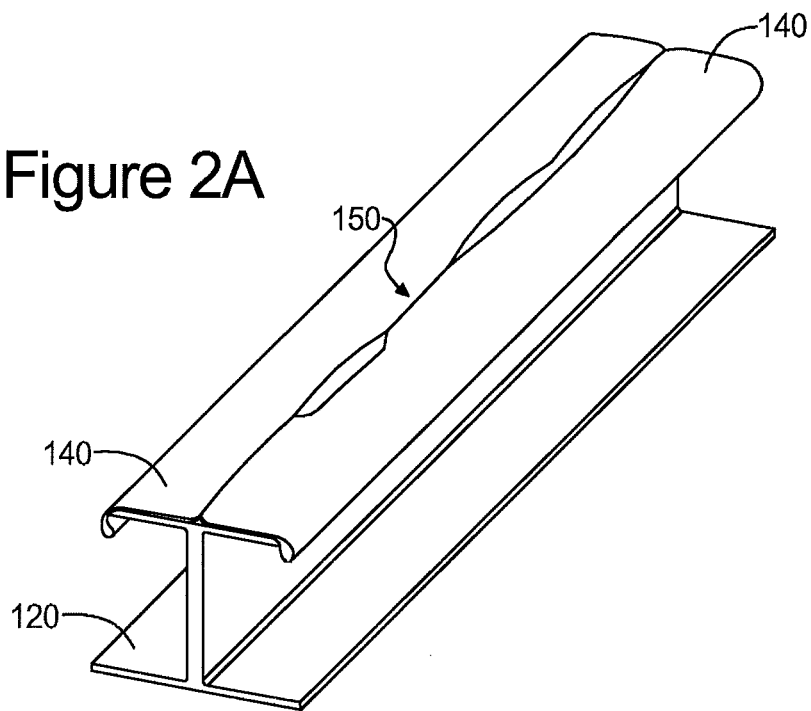
FIGS. 2A and 2B illustrate an adhesive on a carrier after squeezing, according to an exemplary aspect.
Figure 2B:
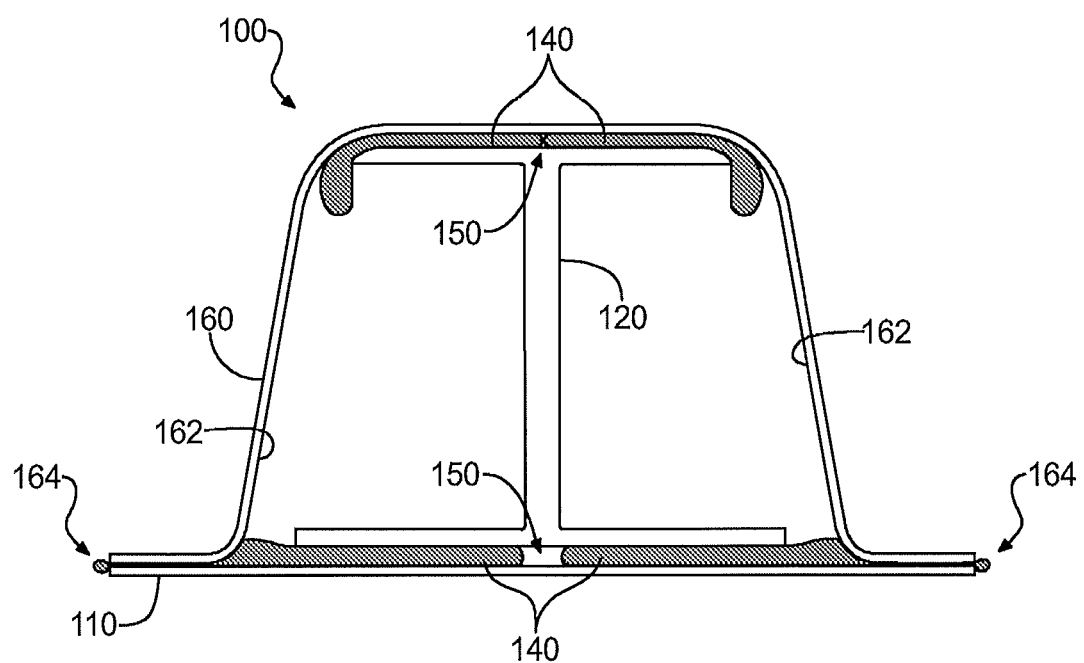

FIGS. 2A and 2B illustrate adhesive 140 after squeezing where the gap between carrier 120 and structural member 160 is relatively small, for example, possibly near a lower tolerance limit. Adhesive 140 can be provided in strips, beads, or plots to ensure that fluid can flow along an outer surface of carrier 120, such as through a fluid flow path, to allow e-coating to flow between carrier 120 and structural member 160. As illustrated in FIG. 2A, if the gap between carrier 120 and structural member 160 is small, or near a lower tolerance limit, adhesive 140 may be squeezed such that adjacent strips or beads of adhesive 140 contact each other, blocking a fluid flow path 150 between the strips of adhesive. As further illustrated in FIG. 2B, adhesive 140 may even be squeezed outside of a weld seam 164.

Figure 3A:
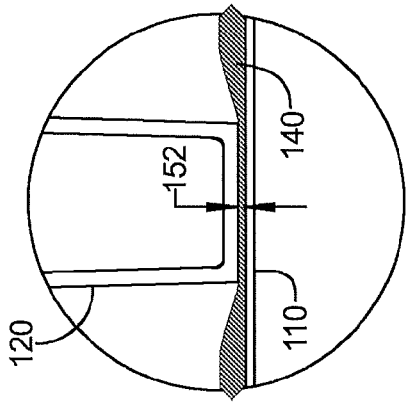
FIGS. 3A-3C are sectional views of system 100, according to an exemplary aspect.
Figure 3B:
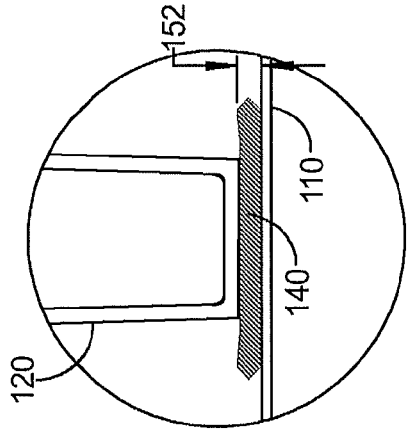
Figure 3C:
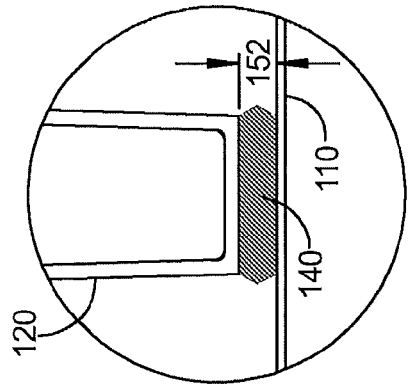

FIGS. 3A-3C are sectional views of system 100, illustrating how gap tolerances can affect the amount of surface area covered by adhesive 140. FIGS. 3A-3C also illustrate system 100 after carrier 120 and structural member 160 are squeezed together. Manufacturing processes can have specified tolerance limits. The amount of adhesive 140 applied may be relatively consistent, as compared to the size of the gap between carrier 120 and structural member 160. In an exemplary embodiment, the gap can be approximately 1-3 mm.

FIG. 3A illustrates a large gap 152, for example, possibly an upper tolerance limit, for the gap between carrier 120 and wall 162 of structural member 160 and/or base 110. FIG. 3B illustrates an exemplary nominal or standard gap 152 between carrier 120 and base 110. FIG. 3C illustrates a very small gap 152, for example, possibly a lower tolerance limit, between carrier 120 and base 110. When gap 152 approaches the lower tolerance limit, such as in FIG. 3C, adhesive 140 can spread out over a wide area, covering a large surface area, potentially preventing e-coating from covering that area and possibly blocking a fluid flow path. In addition, the amount of force required to squeeze carrier 120 and structural member 160 together can increase significantly. Further, the load transfer characteristics between carrier 120 and structural member 160 can be linked to the size of the surface area where adhesive 140 contacts and adheres carrier 120 to structural member 160. Therefore, based on various design characteristics, it may be desirable to send excess adhesive 140 to an alternate location in order to maintain a relatively consistent contact surface area between carrier 120 and structural member 160.

Figure 4A:
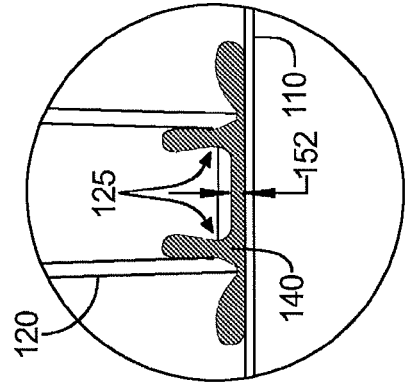
FIGS. 4A-4C are sectional views of system 100, where the carrier includes one or more pathways, according to an exemplary aspect.
Figure 4B:
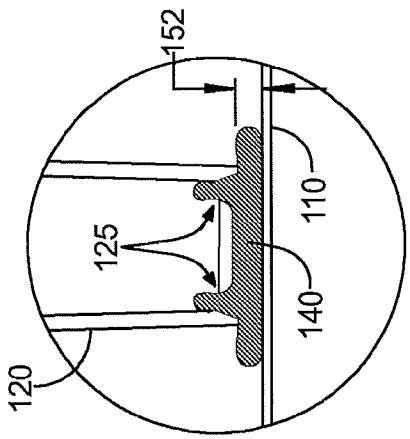
Figure 4C:
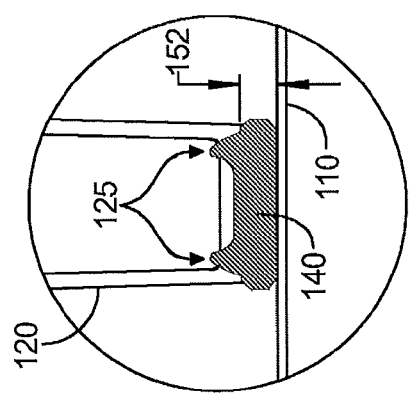

FIGS. 4A-4C are also sectional views of system 100. In FIGS. 4A-4C, carrier 120 can include pathways 125. Pathways 125 can allow adhesive 140 to flow through carrier 120 and thereby moderate the flow of adhesive, reducing the amount of surface area covered by adhesive 140 and the amount of force required to squeeze the components together. As illustrated in FIGS. 4A and 4B, for example, adhesive 140 is able to flow through pathways 125. Adhesive 140 can pass from a first, exterior surface of carrier 120 through to a second, interior surface of carrier 120. Pathways 125 can reduce the amount of adhesive 140 that will cover wall 162 of structural member 160 and/or base 110, and also reduce the amount of force required to squeeze carrier 120 and structural member 160 together. FIG. 4C illustrates a very small gap 152, for example, possibly a lower tolerance limit, between carrier 120 and/or base 110 and wall 162 of structural member 160. Adhesive 140 can flow through pathways 125 and can also flow along base 110. Because some adhesive 140 is able to flow through pathways 125, the amount of surface area covered by adhesive 140 can be significantly reduced.

Adhesive 140 can be placed in many locations relative to pathways 125. For example, the location of pathways 125 and adhesive 140 relative to one another can be described before squeezing. In an exemplary embodiment, adhesive 140 can be placed on carrier 120 such that pathways 125 are located directly beneath the beads or plots of adhesive 140. In another exemplary embodiment, adhesive 140 can be placed on one side of pathways 125. In another exemplary embodiment, carrier 125 may include two or more pathways 125, and adhesive 140 may be placed in between numerous pathways 125. Pathways 125 may be continuous and extend on the full length of the beads of adhesive 140. Pathways 125 may also be interrupted by transversal or lateral ribs.

The width of pathways 125 can be based on a particular application, and may depend on nominal adhesive thickness and tolerances. In an exemplary embodiment, pathways 125 can have a width of approximately 2-3 mm. In another exemplary embodiment, pathways 125 can have a width of approximately 1-1.5 mm, for example, when utilizing a thin layer of adhesive 140, where adhesive 140 is approximately 0.5-2 mm deep. Pathways 125 can also have a width of approximately 4-6 mm, for example, when adhesive 140 is a thicker layer of approximately 2-3 mm deep. The number, orientation, placement, and dimensions of pathways 125 can vary, and can depend on a particular application.

Figure 5:
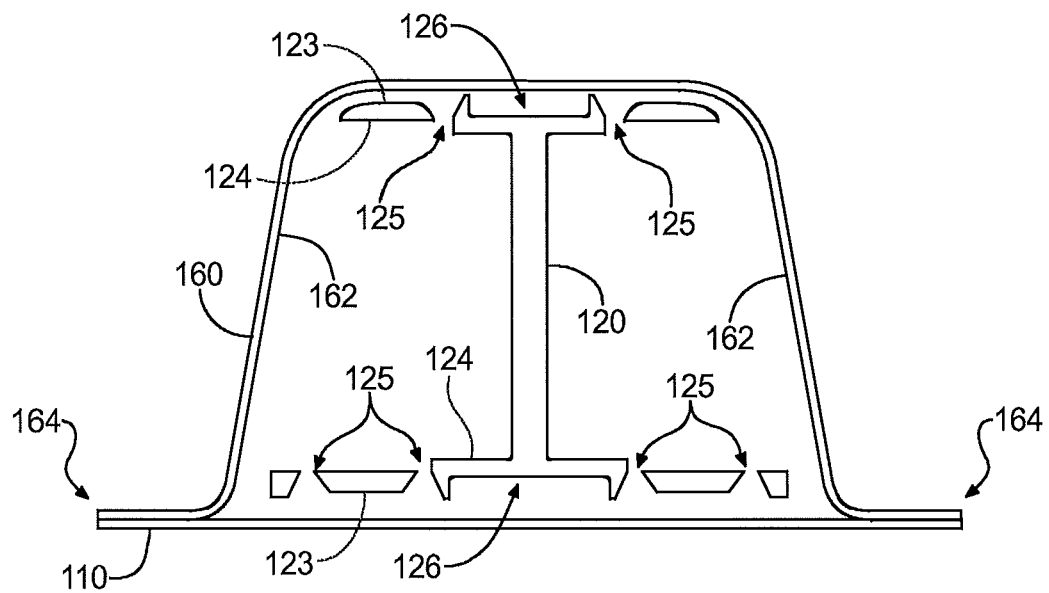
FIG. 5 illustrates a system for reinforcing a cavity using an I-beam shaped carrier, shown without the adhesive, according to an exemplary aspect.

FIG. 5 is a cross-sectional view of exemplary system 100 without adhesive 140, illustrating carrier 120 positioned proximate to structural member 160. As shown in FIG. 5, carrier 120 can be a substantially I-beam shaped carrier, and can include pathways 125 and channels 126. A gap can be defined between at least a portion of carrier 120 and/or base 110 and at least one inner wall 162 of structural member 160. The gap between carrier 120 and one or more inner walls 162 can be determined in part by the design of carrier 120, component manufacturing and assembly tolerances, and the particular application. The gap between carrier 120 and structural member 160 can be about 2 mm and 4 mm. In another example, the gap can be less than about 6 mm. In another example, the gap can be less than about 0.5 mm. Placement of adhesive 140 within the gap can allow selective adhesion of carrier 120 to structural member 160 at one or more locations along the outer surface of carrier 120.

As illustrated in FIG. 5, pathway 125 can be an aperture or opening between an exterior surface 123 to an interior surface 124 of carrier 120. Exterior surface 123 of carrier 120 can be oriented proximate to wall 162 of structural member 160, and can be adhered to structural member 160 using adhesive 140. Interior surface 124 can be disposed opposite to exterior surface 124 and proximate to an internal portion of carrier 120. Adhesive 140 can be substantially disposed on exterior surface 123, and when carrier 120 and structural member 160 are squeezed together, adhesive 140 is able to flow from exterior surface 123 through pathway 125 to interior surface 124. Thus, excess adhesive 140 can reside in an internal portion of carrier 120, as opposed to flowing along wall 162 or outside of weld seam 164.

Figure 6:
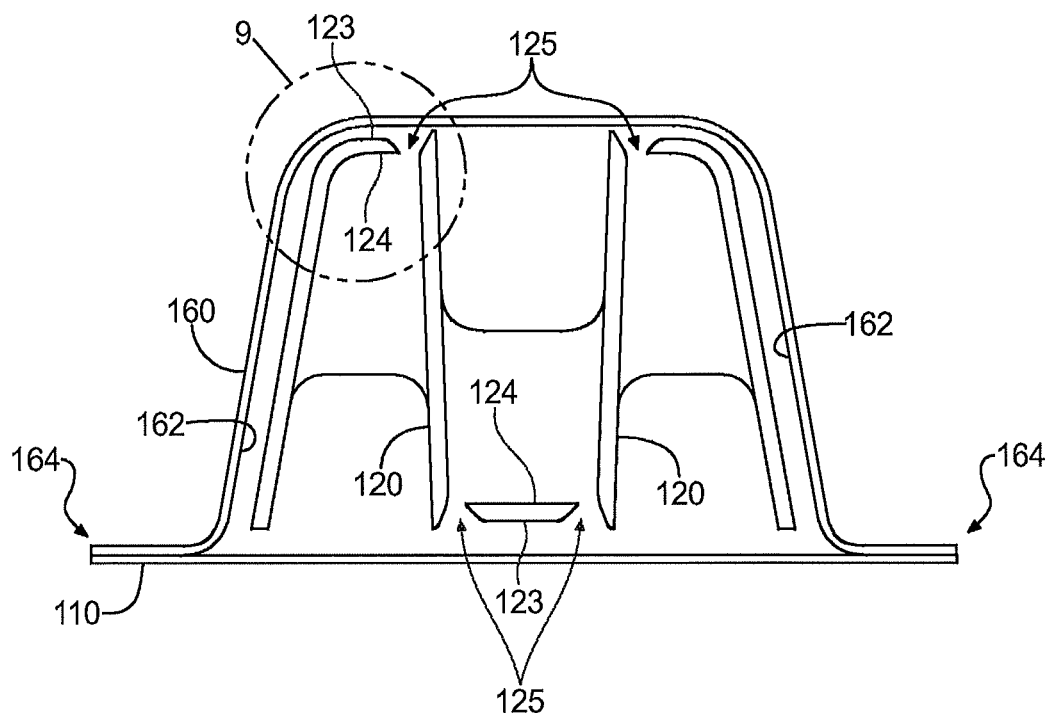
FIG. 6 illustrates a system for reinforcing a cavity using a W-shaped carrier, shown without the adhesive, according to an exemplary aspect.

FIG. 6 is another cross-sectional view of system 100 without adhesive 140, illustrating carrier 120 positioned proximate to structural member 160. As shown in FIG. 6, carrier 120 can be substantially W or M-shaped, and includes pathways 125 and channels 126. Each upper shoulder can include one pathway 125, and a lower mid-section can include two pathways 125. The size, shape, and position of pathways 125 may vary based on a particular application. In one example, the lower pathways 125 are spaced approximately 10-14 mm apart. As illustrated in FIG. 6, pathway 125 can be an aperture or opening between exterior surface 123 and interior surface 124, thereby allowing adhesive 140 to flow from exterior surface 123 through pathway 125 to interior surface 124. Adhesive 140 can be placed in the gap such that adhesive 140 is deformed and contacts both carrier 120 and structural member 160. Adhesive 140 can also be placed to bond base 110 to carrier 120. As previously discussed, the amount of surface area covered by adhesive 140 after the components are squeezed together may vary, and may disrupt a fluid flow path where the tolerance approaches a lower limit, such as for a very small gap. Carrier 120 can include pathways 125 and channels 126. Pathways 125 provide an alternate avenue for adhesive 140 to flow, thus reducing the amount of surface area covered by adhesive 140 after squeezing carrier 120 and structural member 160 together. Further, pathways 125 can also reduce the amount of force required to deform adhesive 140 and position carrier 120 properly within the cavity.

Channels 126 can provide a dedicated fluid flow path to allow fluid, such as e-coat fluid, to flow between carrier 120 and structural member 160 and base 110. In one example, channel 126 can be approximately 10-15 mm wide. In another example, channel 126 can be approximately 5-50 mm wide, depending on the size, shape, and configuration of carrier 120. Channel 126 may have a depth that depends on the thickness of adhesive 140 and various manufacturing and assembly tolerances. In one example, channel 127 has a depth of approximately 2-3 mm. In another example, channel 127 can have a depth of approximately 1-6 mm.

Figure 7:
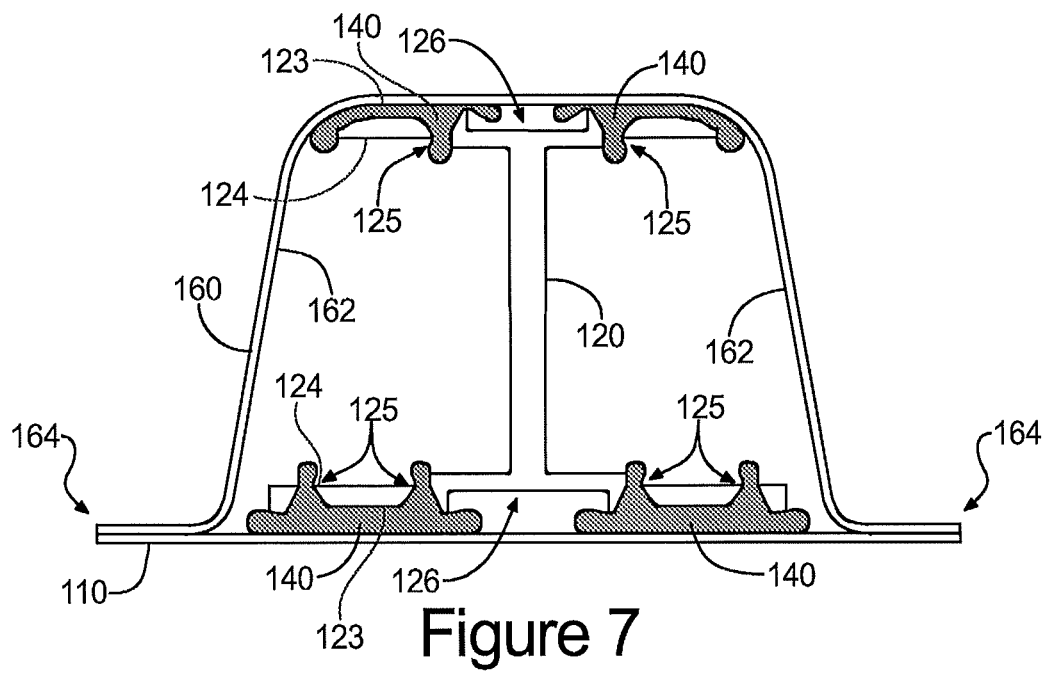
FIG. 7 illustrates the system of FIG. 5, shown with the adhesive, according to an exemplary aspect.
Figure 8:
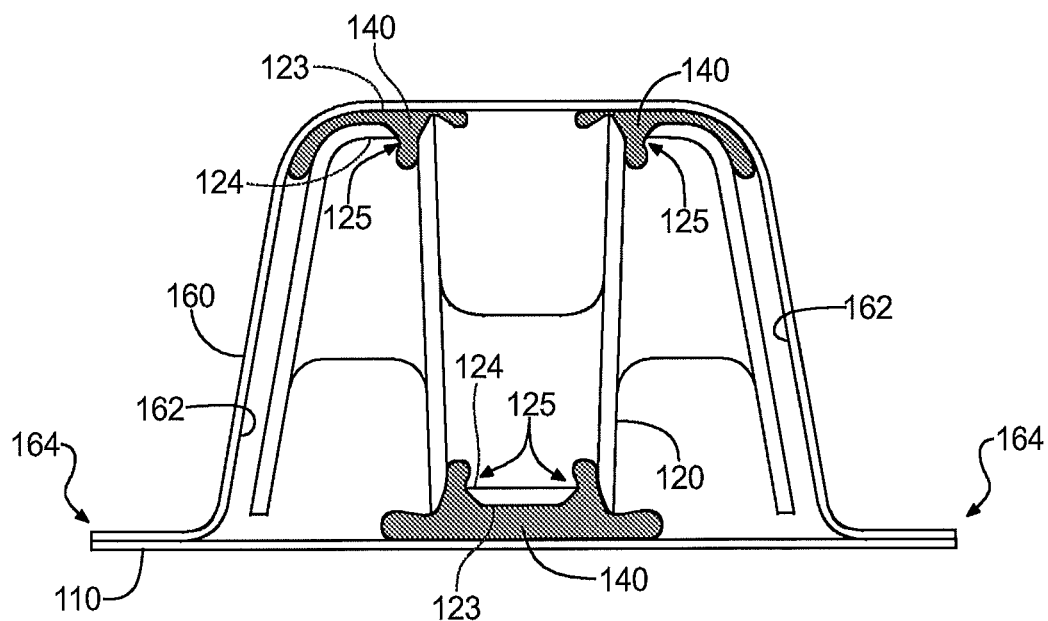
FIG. 8 illustrates the system of FIG. 6, shown with the adhesive, according to an exemplary aspect.

As further illustrated in FIGS. 7 and 8, adhesive 140 can flow along base 110 and walls 162 of structural member 160. Adhesive 140 can also flow through pathways 125, thereby preventing adjacent beads or rows of adhesive 140 from contacting one another and blocking a fluid flow path. As illustrated in FIGS. 7 and 8, adhesive 140 can flow through pathways 125, flowing from exterior surface 123 to interior surface 124. In addition, channel 126 provides additional space for a fluid to flow, such as during an e-coating process. In addition, because adhesive 140 is provided with additional avenues to flow through carrier 120, the amount of force required to squeeze carrier 120 to structural member 160 can be reduced. Further, when the gap is relatively small, such as a lower tolerance limit, adhesive 140 can flow through carrier 120 and can be less likely to flow out through a weld seam 164.

Figure 9:
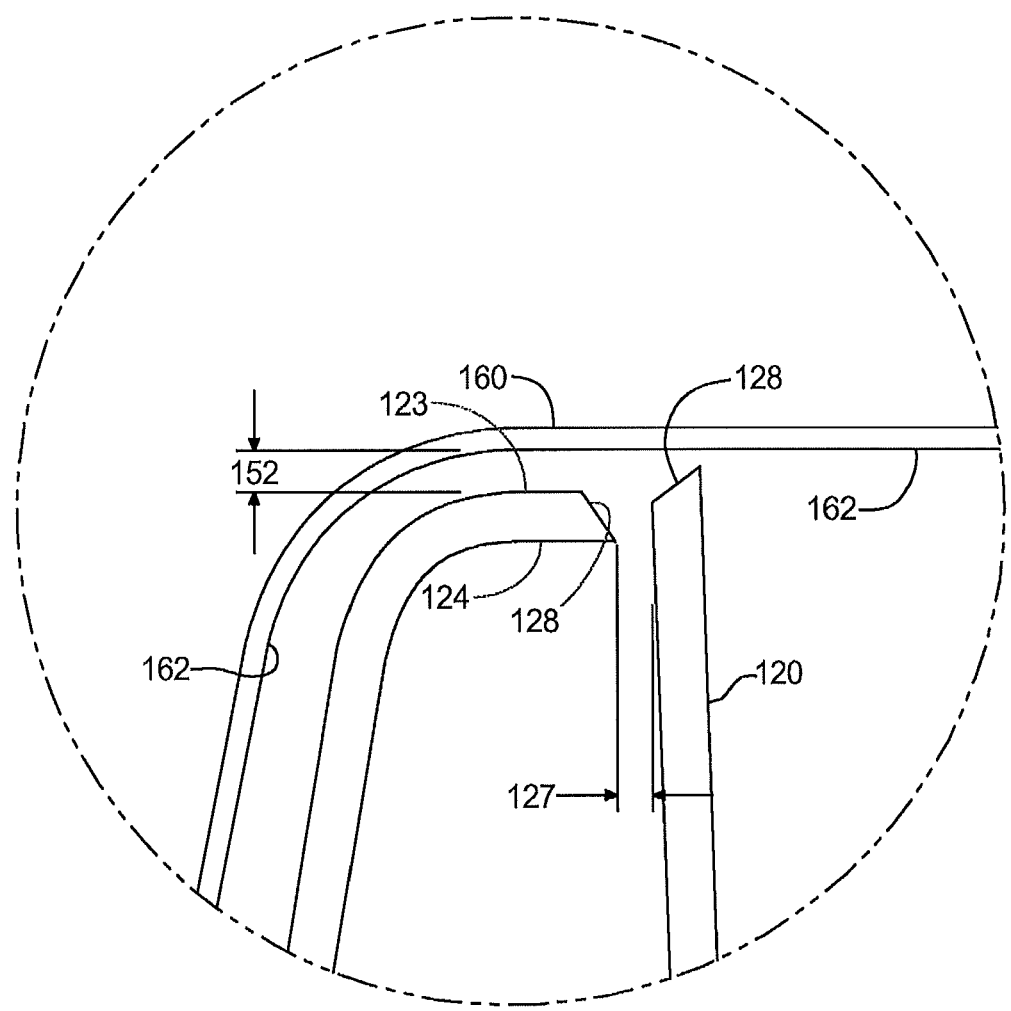
FIG. 9 is a close-up view of a pathway in a carrier, according to an exemplary aspect.

FIG. 9 is a close-up view of an exemplary pathway 125 from FIG. 6. Gap 152 between carrier 120 and wall 162 of structural member 160 may vary. In one example, gap 152 can be approximately 1-3 mm in width. In addition, the size, shape, orientation, and position of pathway(s) 125 may also vary based on any number of factors, including the size of gap 152, the amount of adhesive 140, the size of carrier 120, etc. As illustrated in FIG. 9, pathway 125 can include angled edges 128. Edges 128 can be normal or parallel to the wall 162. Edges 128 can also be angled from approximately 10° to approximately 45° to help direct the flow of adhesive 140 through pathway 125. In addition, edges 128 may be sharp or also include a fillet to facilitate the flow of adhesive 140 through pathway 125 during squeezing.

Pathway 125 can have a width 127 that varies based on a wide number of factors, including nominal adhesive thickness and tolerances. In one example, width 127 of pathway 125 is approximately 2-3 mm. In another example, width 127 can be 1-1.5 mm, for example, when using a layer of adhesive 140 that is approximately 0.5-2 mm thick. Width of pathway 125 can also be approximately 4-6 mm, or for example, when using a layer of adhesive 140 that is approximately 2-3 mm thick.

Figure 10A:
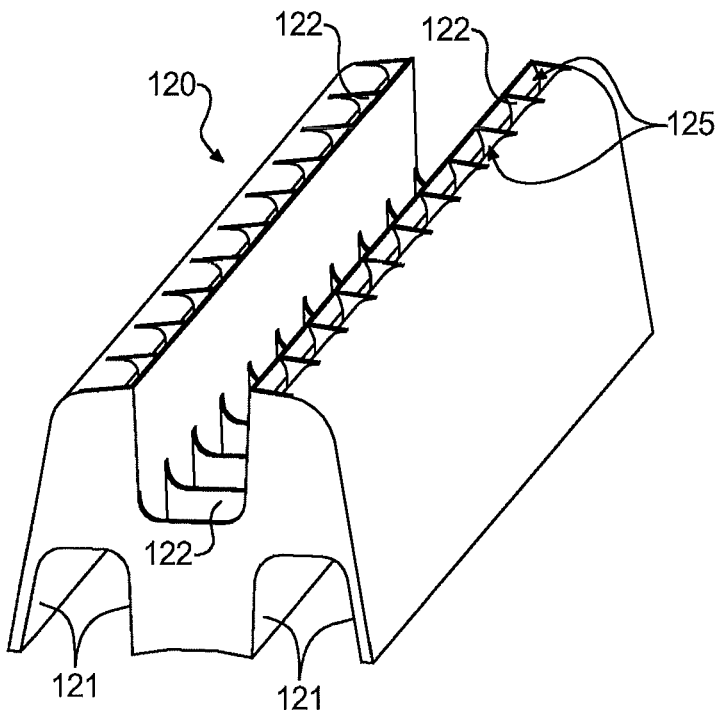
FIGS. 10A-10B illustrate an exemplary W-shaped carrier, according to an exemplary aspect.
Figure 10B:
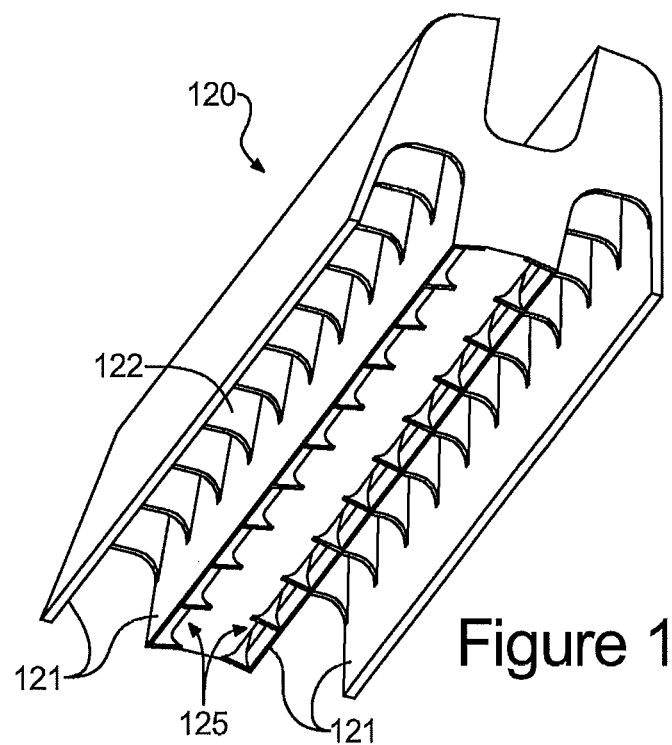

FIGS. 10A and 10B illustrate one example of a carrier 120. As illustrated in FIGS. 10A and 10B, carrier 120 can be a substantially W or M-shaped carrier that includes pathways 125. Carrier 120 can also include main longitudinal ribs 121 that run the length of carrier 120, and a plurality of lateral ribs 122. Lateral ribs 122 can also be added on one or on both sides of the beads or plots of adhesive 140. Lateral ribs 122 can provide additional structural support to carrier 120, such as to avoid buckling or main longitudinal ribs 121 and/or any other part of carrier 120. Lateral ribs 122 can be shaped and oriented based on any number of design parameters. In one example, lateral ribs 122 are approximately 0.5-1 mm in height, and could be between 2-3 mm in height. Lateral ribs 122 can have a thickness of approximately 0.5-1 mm, and could be approximately 2-3 mm thick.

Figure 11A:
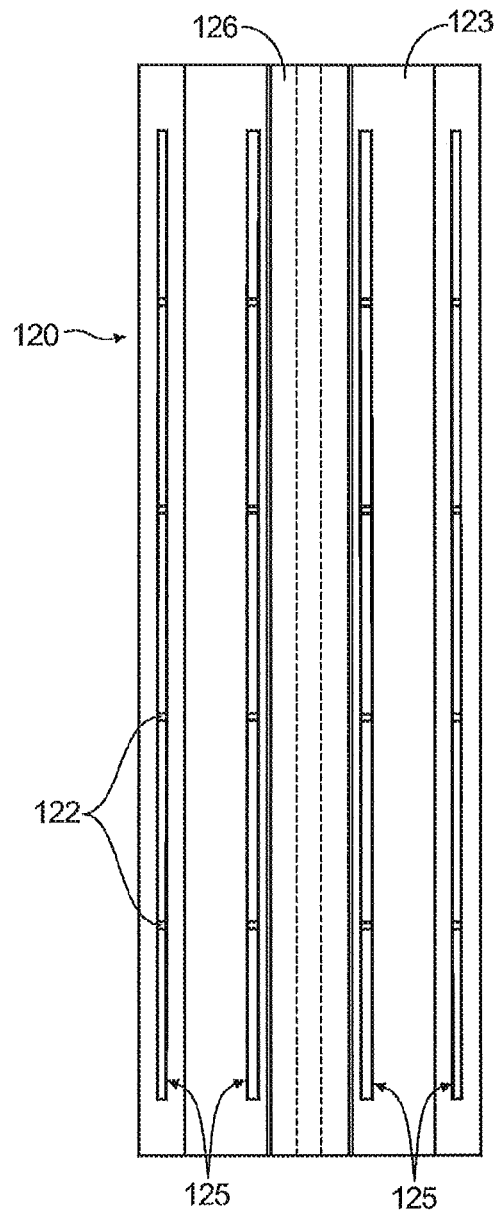
FIG. 11A illustrates a top view of an I-beam shaped carrier, according to an exemplary aspect.
Figure 11B:
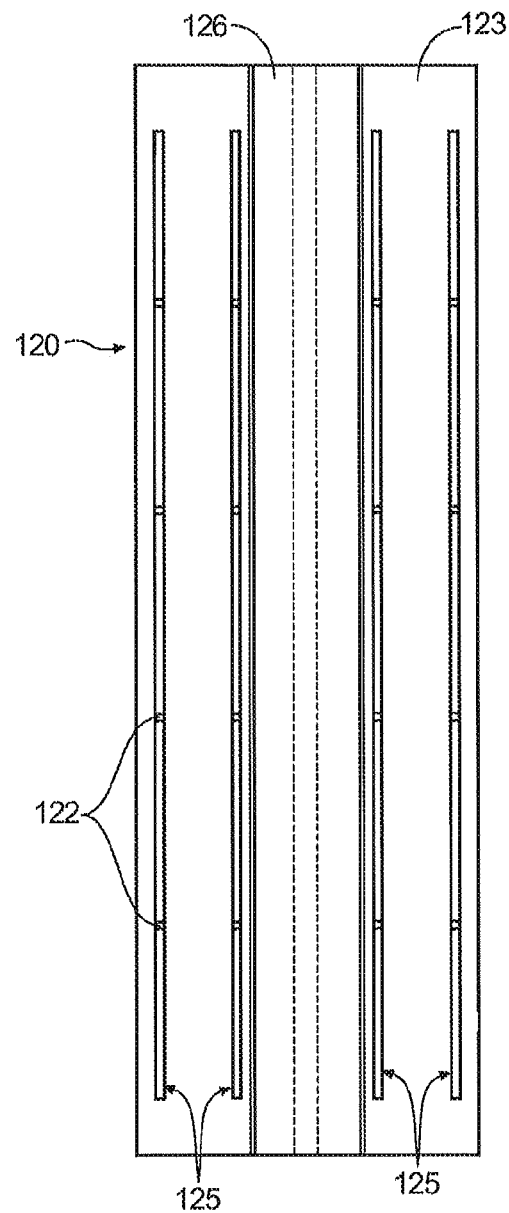
FIG. 11B illustrates a bottom view of an I-beam shaped carrier, according to an exemplary aspect.

FIG. 11A is a top view, and FIG. 11B is a bottom view of an exemplary I-beam shaped carrier 120, as illustrated in FIGS. 5 and 7. As illustrated, carrier 120 includes multiple pathways 125, which can be periodically spaced along exterior surface 123, and can provide a passageway for adhesive to flow through to interior surface 124. Pathways 125 may be continuous, extending substantially the full length of carrier 120, as illustrated in FIGS. 11A and 11B. Alternatively, pathways 125 may be periodically spaced along carrier 120, or may be separated by lateral ribs, which may also be referred to as transverse or transversal ribs. The number, arrangement, orientation, size, and shape of pathways 125 may depend on, for example, a particular application, the number of beads or plots of adhesive 140, or any other design consideration.

Figure 12A:
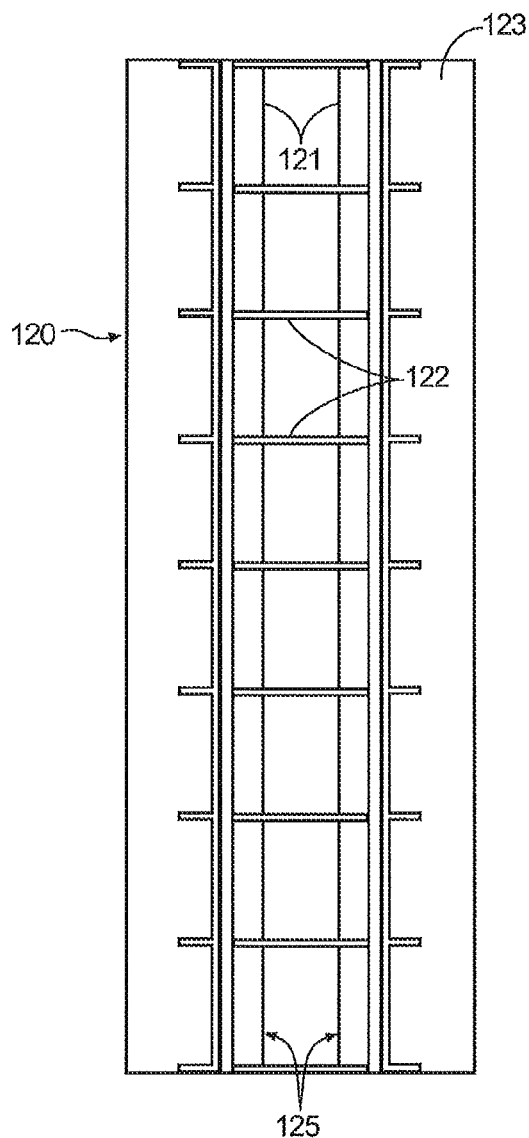
FIG. 12A illustrates a top view of a W-shaped carrier, according to an exemplary aspect.
Figure 12B:
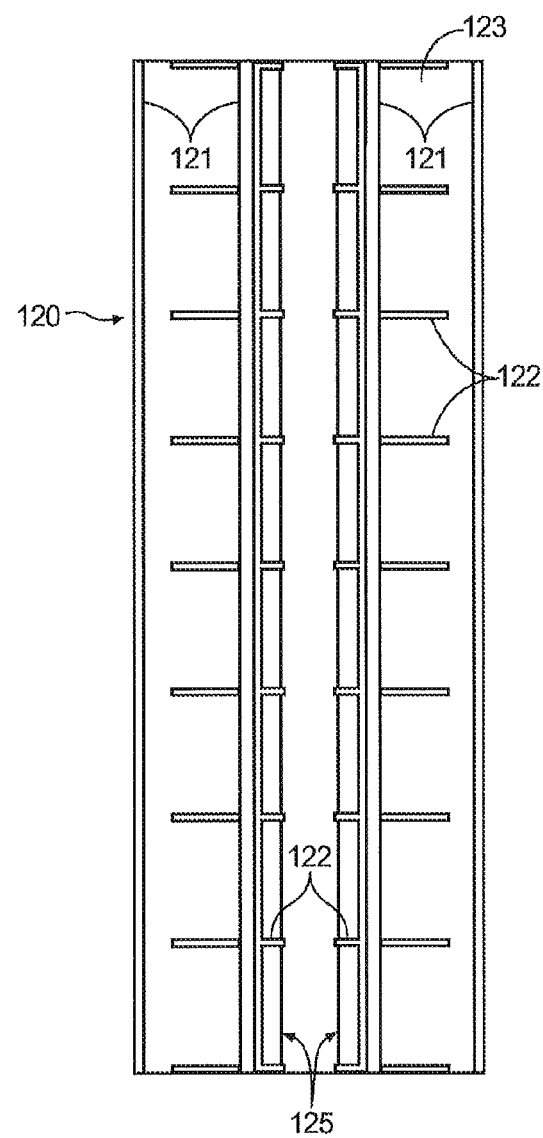
FIG. 12B illustrates a bottom view of a W-shaped carrier, according to an exemplary aspect.

FIG. 12A is a top view, and FIG. 12B is a bottom view of an exemplary W or M-shaped carrier 120, as illustrated in FIGS. 6 and 8. As illustrated, carrier 120 can include multiple pathways 125, which are periodically spaced along exterior surface 123, and provide a passageway for adhesive to flow through to interior surface 124. Carrier 120 can also include main longitudinal ribs 121 that run the length of carrier 120, and a plurality of lateral ribs 122. Lateral ribs 122 can be placed such that adhesive 140 will be directed to flow through pathways 125. Lateral ribs 122 can also limit the lateral flow of adhesive 140, thereby further controlling the location of excess adhesive 140. Such configurations can ensure that adhesive 140, for example, excess adhesive, is directed to designated areas. In one example, a designated area can be one that is subject to less e-coat flow to avoid adhesive 140 being washed out in a cleaning or a treatment bath. In another example, a designated area can be an area away from a channel, such as channel 126.

Figure 13A:
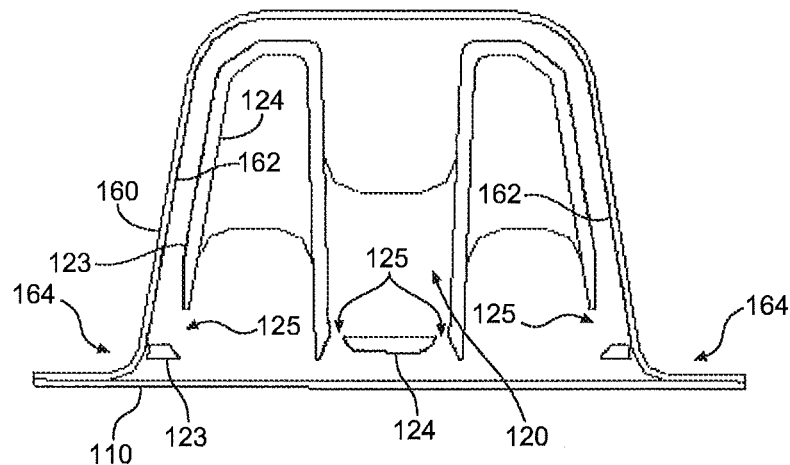
FIG. 13A illustrates a system for reinforcing a cavity using another W-beam shaped carrier, shown without the adhesive, according to an exemplary aspect.

FIG. 13A is a cross-sectional view of an exemplary system 100 without adhesive 140, illustrating yet another W or M-shaped carrier 120 positioned proximate to structural member 160. As shown in FIG. 13A, carrier 120 can include multiple pathways 125. A lower mid-section of carrier 120 can include two pathways 125, and each opposing lower extremity of carrier 120 can include a pathway 125. The size, shape, and position of pathways 125 can vary based on a particular application. In one example, the lower pathways 125 can be spaced approximately 10-14 mm apart. As illustrated in FIG. 13A, pathway 125 is an aperture or opening between exterior surface 123 and interior surface 124. Thus, adhesive 140 is able to flow from exterior surface 123 through pathway 125 to interior surface 124, thereby bonding base 110 to carrier 120. The amount of surface area covered by adhesive 140 after the components are squeezed together may vary, and may disrupt a fluid flow path where the tolerance approaches a lower limit, such as for a very small gap. Carrier 120 can include pathways 125 that provide an alternate avenue for adhesive 140 to flow, thus reducing the amount of surface area covered by adhesive 140 after squeezing carrier 120 and structural member 160 together. Further, pathways 125 can also reduce the amount of force required to deform adhesive 140 and position carrier 120 properly within the cavity.

Figure 13B:
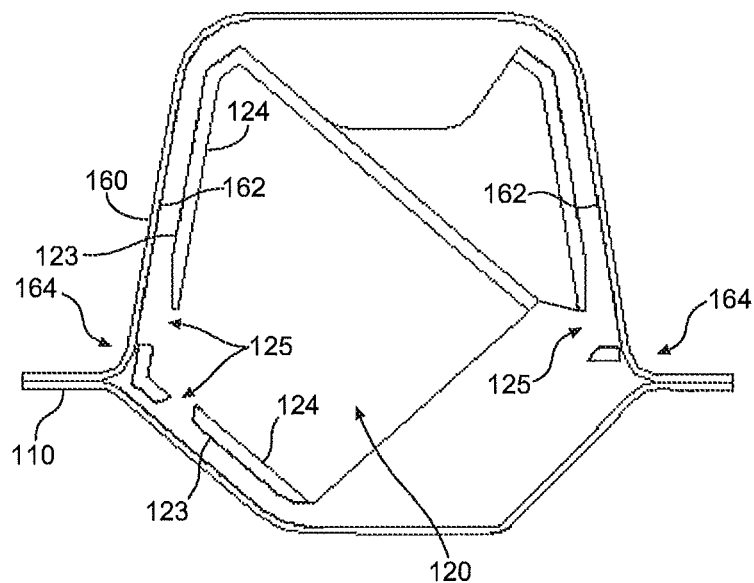
FIG. 13B illustrates a system for reinforcing a cavity using Z-shaped carrier, shown without the adhesive, according to an exemplary aspect.

FIG. 13B is a cross-sectional view of an exemplary system 100 without adhesive 140, illustrating a Z-shaped carrier 120 positioned proximate to structural member 160. As shown in FIG. 13A carrier 120 can include multiple pathways 125. A lower mid-section of carrier 120 can include two pathways 125, and one outer extremity of carrier 120 can also include a pathway 125.

Figure 14A:
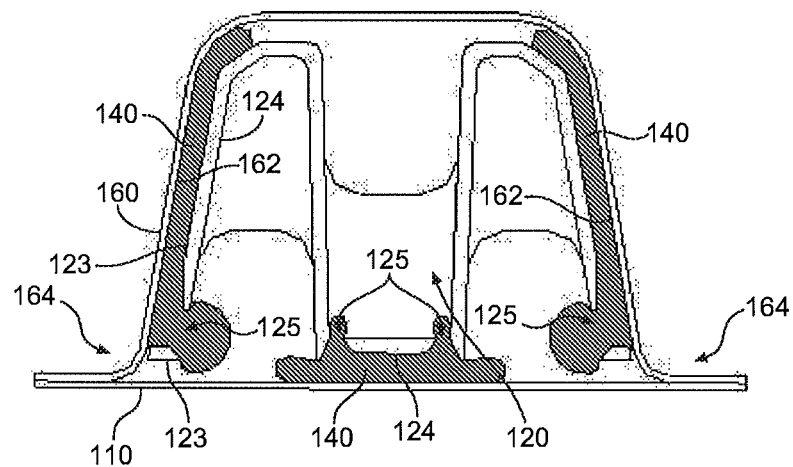
FIG. 14A illustrates the system of FIG. 13A, shown with the adhesive, according to an exemplary aspect.
Figure 14B:
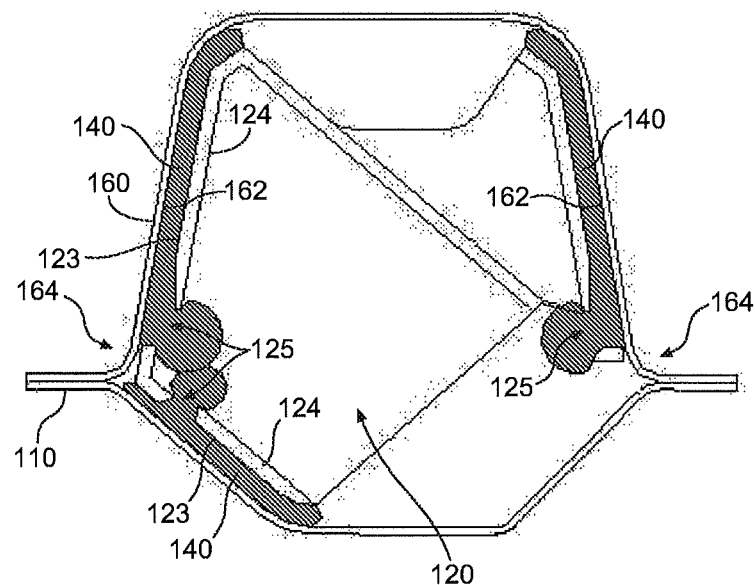
FIG. 14B illustrates the system of FIG. 13B, shown with the adhesive, according to an exemplary aspect.

As further illustrated in FIGS. 14A and 14B, adhesive 140 can flow along base 110 and walls 162 of structural member 160. Adhesive 140 can also flow through pathways 125, thereby preventing adjacent beads or rows of adhesive 140 from contacting one another and blocking a fluid flow path. As illustrated in FIGS. 14A and 14B, adhesive 140 can flow through pathways 125, flowing from exterior surface 123 to interior surface 124, thus bonding carrier 120 to structural member 160. In addition, because adhesive 140 can be provided with additional avenues to flow through carrier 120, the amount of force required to squeeze carrier 120 to structural member 160 can be reduced.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as limiting.

All terms used in the claims are intended to be given their broadest reasonable constructions and their ordinary meanings as understood by those skilled in the art unless an explicit indication to the contrary is made herein. For example, use of the singular articles such as "a," "the," "said," etc. should be read to recite one or more of the indicated elements unless a claim recites an explicit limitation to the contrary.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system for reinforcing a cavity, comprising:
 a substantially rigid carrier configured to reside in a cavity defined by one or more walls of a structural member;
 a pathway disposed through the thickness of the carrier providing an aperture between an exterior surface and an interior surface of the carrier; and
 an adhesive disposed in a gap between at least a portion of the exterior surface of the carrier and the wall of the structural member,
 wherein the adhesive is arranged to cover the aperture at the exterior surface of the carrier,
 wherein the adhesive in a flowable state is present in the pathway,
 wherein the pathway allows the adhesive to flow through the carrier.

2. The system of claim 1, wherein the carrier includes a longitudinal rib that is oriented parallel to a long axis of the structural member, and a plurality of lateral ribs.

3. The system of claim 1, wherein the adhesive is disposed on the carrier such that when the carrier is adhered to the structural member, at least a portion of the adhesive flows into the pathway.

4. The system of claim 1, wherein the carrier is formed from a metal, plastic, carbon fiber, nylon, glass-reinforced nylon, organic material, or a combination thereof.

5. The system of claim 1, wherein the adhesive is a polymer composition, a mixture of thermoplastic resins and epoxy resins, or a combination thereof.

6. The system of claim 1, wherein the adhesive is extruded as a bead, plot, row, or a combination thereof on the carrier.

7. The system of claim 1, wherein the carrier is shaped as an I-beam, a W-shape, an M-shape, an H-shape, a C-shape, a U-shape, a Z-shape, an S-shape, an N-shape, an X-shape, a V-shape, an E-shape, a K-shape, a T-shape, or a combination thereof.

8. The system of claim 1, wherein the carrier includes a plurality of pathways, wherein each pathway directs the flow of the adhesive through the carrier.

9. The system of claim 1, wherein the carrier includes a plurality of pathways and a plurality of lateral ribs, wherein each pathway is defined in part by one of the plurality of lateral ribs.

10. The system of claim 1, wherein the carrier is shaped as an I-beam, and the carrier further includes a channel disposed between two or more pathways.

11. The system of claim 1, further comprising one or more protective films disposed over at least a portion of the adhesive.

12. The system of claim 1, further comprising the structural member.

13. The system of claim 12, wherein the gap between at least a portion of the carrier and the wall of the structural member is less than approximately 6 mm when the carrier is positioned within the cavity.

14. The system of claim 1, wherein the pathway has a width of between about 1-6 mm.

15. The system of claim 1, wherein the pathway has a width of between about 2-3 mm.

16. The system of claim 1, wherein the pathway has angled edges to direct the flow of the adhesive.

17. The system of claim 16, wherein the angled edges are angled from about 10° to about 45°.

18. The system of claim 1, wherein a portion of the adhesive is present in the pathway disposed through the thickness of the carrier.

19. The system of claim 1, wherein the adhesive is an adhesive that expands less than about 20% when curing.

20. The system of claim 1, wherein the adhesive is an adhesive that expands less than about 5% when curing.

21. The system of claim 1, wherein the adhesive is a non-expanding adhesive.

22. The system of claim 1, wherein the adhesive includes separate adhesive portions that are not in contact with each other.

23. The system of claim 1, wherein the pathway is a first pathway, wherein the system comprises a second pathway disposed through the thickness of the carrier providing an aperture between an exterior surface and an interior surface of the carrier, wherein the second pathway is distinct from the first pathway, wherein an adhesive is arranged to cover the aperture of the second pathway, at the exterior surface of the carrier,
wherein the carrier comprises a longitudinal rib, an upper lateral rib, and a lower lateral rib, and
wherein the first pathway is located in the upper lateral rib of the carrier, and the second pathway is located in the lower lateral rib of the carrier.

24. The system of claim 1, wherein the one or more walls of the structural member do not have an aperture.

25. A system for reinforcing a cavity, comprising:
a substantially rigid carrier configured to reside in a cavity defined by one or more walls of a structural member;
a pathway disposed through the thickness of the carrier providing an aperture between an exterior surface and an interior surface of the carrier; and
an adhesive disposed in a gap between at least a portion of the exterior surface of the carrier and the wall of the structural member,
wherein the adhesive is arranged to cover the aperture at the exterior surface of the carrier,
wherein the adhesive in a flowable state is present in the pathway,
wherein the pathway allows the adhesive to flow through the carrier,
wherein the carrier is shaped as an I-beam, and the carrier further includes a channel disposed between two or more pathways,
wherein the channel provides a fluid pathway between the exterior surface of the carrier and the structural member.

26. A system for reinforcing a cavity, comprising:
a substantially rigid carrier configured to reside in a cavity defined by one or more walls of a structural member;
a pathway disposed through the thickness of the carrier providing an aperture between an exterior surface and an interior surface of the carrier; and
an adhesive disposed in a gap between at least a portion of the exterior surface of the carrier and the wall of the structural member,
wherein the adhesive is arranged to cover the aperture at the exterior surface of the carrier,
wherein the adhesive in a flowable state is present in the pathway,
wherein the pathway allows the adhesive to flow through the carrier,
wherein the adhesive has a viscosity high enough to retain an extruded shape until the carrier is positioned within the cavity, and low enough to flow through the pathway when the carrier and the structural member are squeezed together.

27. A system for reinforcing a cavity, comprising:
a substantially rigid carrier configured to reside in a cavity defined by one or more walls of a structural member;
the structural member;
an adhesive disposed in a gap between at least a portion of an exterior surface of the carrier and a wall of the structural member; and
a pathway disposed through the thickness of the carrier, wherein the pathway and the adhesive are arranged to accommodate a flow of the adhesive through the pathway and between the exterior surface and an interior surface of the carrier,
wherein the adhesive in a flowable state is present in the pathway.

28. The system of claim 27, wherein the adhesive is present in the pathway.

29. The system of claim 27, wherein the structural member is made of a metal, plastic, carbon fiber, organic material, or a combination thereof.

30. The system of claim 27, wherein the adhesive is extruded as a bead, plot, row, or a combination thereof, on the carrier, the wall of the structural member, or both the carrier and the wall of the structural member.

31. The system of claim 27, wherein the adhesive is disposed on the carrier such that when the carrier is adhered to the structural member, at least a portion of the adhesive flows into the pathway.

32. The system of claim 27, wherein a portion of the adhesive is present in the pathway disposed through the thickness of the carrier.

33. The system of claim 27, wherein the adhesive is an adhesive that expands less than about 20% when curing.

34. The system of claim 27, wherein the adhesive is an adhesive that expands less than about 5% when curing.

35. The system of claim 27, wherein the adhesive is a non-expanding adhesive.

36. The system of claim 27, wherein the one or more walls of the structural member do not have an aperture.

37. The system of claim 27, wherein the adhesive has a viscosity high enough to retain an extruded shape until the carrier is positioned within the cavity, and low enough to flow through the pathway when the carrier and the structural member are squeezed together.

38. A method of reinforcing a cavity, comprising adhering a substantially rigid carrier to a structural member with an adhesive,
   wherein the substantially rigid carrier is configured to reside in a cavity defined by one or more walls of the structural member;
   wherein a pathway disposed through the thickness of the carrier provides an aperture between an exterior surface and an interior surface of the carrier;
   wherein the adhesive is disposed in a gap between at least a portion of the exterior surface of the carrier and the wall of the structural member,
   wherein the adhesive is arranged to cover the aperture at the exterior surface of the carrier,
   wherein the adhesive in a flowable state is present in the pathway,
   wherein the pathway allows the adhesive to flow through the carrier.

39. The method of claim 38, wherein the adhesive is disposed on the carrier such that when the carrier is adhered to the structural member, at least a portion of the adhesive flows into the pathway.

40. The method of claim 38, wherein a portion of the adhesive is present in the pathway disposed through the thickness of the carrier.

41. The method of claim 38, wherein the adhesive is an adhesive that expands less than about 20% when curing.

42. The method of claim 38, wherein the adhesive is an adhesive that expands less than about 5% when curing.

43. The method of claim 38, wherein the adhesive is a non-expanding adhesive.

44. The method of claim 38, wherein the one or more walls of the structural member do not have an aperture.

45. The method of claim 38, wherein the adhesive has a viscosity high enough to retain an extruded shape until the carrier is positioned within the cavity, and low enough to flow through the pathway when the carrier and the structural member are squeezed together.

* * * * *